US011297295B1

(12) United States Patent
Kim

(10) Patent No.: US 11,297,295 B1
(45) Date of Patent: Apr. 5, 2022

(54) DISPLAY DEVICE AND METHOD

(71) Applicant: LG ELECTRONICS INC., Seoul (KR)

(72) Inventor: Kyuri Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/090,826

(22) Filed: Nov. 5, 2020

(30) Foreign Application Priority Data

Sep. 16, 2020 (KR) .......................... 10-2020-0118894

(51) Int. Cl.
*G06T 7/136* (2017.01)
*H04N 9/77* (2006.01)
*G09G 3/20* (2006.01)

(52) U.S. Cl.
CPC .............. *H04N 9/77* (2013.01); *G06T 7/136* (2017.01); *G09G 3/2003* (2013.01); *G06T 2207/30201* (2013.01); *G09G 2320/0285* (2013.01); *G09G 2320/0626* (2013.01); *G09G 2320/0666* (2013.01)

(58) Field of Classification Search
CPC . H04N 9/77; G06T 7/136; G06T 2207/30201; G09G 3/2003; G09G 2320/0285; G09G 2320/0626; G09G 2320/0666
See application file for complete search history.

(56) References Cited

U.S. PATENT DOCUMENTS

| 9,912,924 | B2 | 3/2018 | Kim et al. | |
|---|---|---|---|---|
| 10,002,587 | B2* | 6/2018 | Mizushiro | H04N 9/3194 |
| 2009/0060379 | A1* | 3/2009 | Manabe | H04N 5/2351 |
| | | | | 382/274 |
| 2009/0284457 | A1 | 11/2009 | Botzas et al. | |
| 2011/0227966 | A1 | 9/2011 | Mori | |
| 2012/0170845 | A1 | 7/2012 | Min et al. | |
| 2013/0329098 | A1* | 12/2013 | Lim | H04N 5/23229 |
| | | | | 348/246 |

(Continued)

FOREIGN PATENT DOCUMENTS

| EP | 3651456 | 5/2020 |
|---|---|---|
| JP | 2009-053894 | 3/2009 |

(Continued)

OTHER PUBLICATIONS

European Patent Office Application Serial No. 20216461.2, Search Report dated Jun. 9, 2021, 14 pages.

(Continued)

*Primary Examiner* — Antonio A Caschera
(74) *Attorney, Agent, or Firm* — Lee, Hong, Degerman, Kang & Waimey PC

(57) ABSTRACT

One or more embodiments of the present invention are directed to a display device including a display unit configured to output an image, a brightness converting unit configured to acquire a brightness corrected image by correcting brightness of the image, and a controller configured to detect a face included in the image, to acquire a color corrected image by applying a gain value to a color of the brightness corrected image according to whether the face is detected, and to output the color corrected image or the brightness corrected image through the display unit.

13 Claims, 10 Drawing Sheets

(56) References Cited

U.S. PATENT DOCUMENTS

| | | |
|---|---|---|
| 2015/0054980 A1 | 2/2015 | Nikkanen et al. |
| 2020/0105226 A1* | 4/2020 | Greenebaum ............ G09G 5/10 |
| 2020/0204775 A1* | 6/2020 | Kitajima ................ H04N 9/735 |

FOREIGN PATENT DOCUMENTS

| | | |
|---|---|---|
| JP | 2010283785 | 12/2010 |
| JP | 2011082691 | 4/2011 |
| JP | 2013176144 | 9/2013 |
| KR | 10-2016-0040959 | 4/2016 |

OTHER PUBLICATIONS

Pan et al., "P-49: A Gamut-Mapping Algorithm with Separate Skin and Non-Skin Color Preference Controls for Wide-Color-Gamut TV," SID 2008, 2008 SID International Symposium, Society for Information Display, May 2008, 4 pages.

Korean Intellectual Property Office Application No. 10-2020-0118894, Office Action dated Dec. 23, 2021, 47 pages.

Japan Patent Office Application No. 2020-213164, Notice of Allowance dated Dec. 7, 2021, 2 pages.

\* cited by examiner (a)

(b)

(c)

(a)

(b)

(c)

DISPLAY DEVICE AND METHOD

CROSS-REFERENCE TO RELATED APPLICATIONS

Pursuant to 35 U.S.C. § 119(a), this application claims the benefit of earlier filing date and right of priority to Korean Patent Application No. 10-2020-0118894, filed on Sep. 16, 2020, the contents of which are hereby incorporated by reference herein in its entirety.

BACKGROUND

Field of the Invention

The present disclosure relates to a display device and method, and more particularly, to a display device and method for processing an image to correct a color of an image and output the color-corrected image.

Discussion of the Related Art

A display device is a device having a function of receiving, processing, and displaying an image that may be viewed by a user. The display device receives, for example, a broadcast signal selected by a user among broadcast signals transmitted from a broadcasting station, separates an image signal from the received signal, and displays the separated image signal on a display.

Meanwhile, it is important for the display device to provide a user with an image of visibility enabling a shape or color of an object to be easily identified even from a distance, natural color, and clear image quality.

To this end, various methods such as image enhancement, color enhancement, white balance adjustment, image brightness conversion using a look-up table, and color adjustment using color gain are provided.

Meanwhile, a typical method among the methods mentioned above is to enhance an output image by correcting brightness of the image, but this method has a problem in that a clear image cannot be provided due to color distortion that occurs as excessive enhancement is applied to a skin color of a human or an object having a color similar to the skin color of the human.

SUMMARY

An aspect of the present disclosure is directed to preventing color distortion that occurs according to enhancement of an image.

Another aspect of the present disclosure is directed to preventing an occurrence of color distortion in a specific part of an image by correcting a color of an image through face detection using an artificial intelligence model.

To achieve these and other advantages and in accordance with the purpose of the disclosure, as embodied and broadly described herein, there is provided a display device including: a display unit configured to output an image; a brightness converting unit configured to acquire a brightness corrected image by correcting brightness of the image; and a controller configured to detect a person included in the image, to acquire a color corrected image by applying a gain value to a color of the brightness corrected image according to whether the person is detected, and to output the color corrected image or the brightness corrected image through the display unit.

The brightness converting unit may be configured to acquire a brightness value corresponding to each unit pixel included in the image, to acquire a corrected brightness value corresponding to the brightness value through a look-up table including a linear or nonlinear section, and to acquire a brightness corrected image obtained by correcting the brightness value of each unit pixel based on the corrected brightness value.

The controller may be configured to output the brightness corrected image through the display unit when a person is not detected in the image.

The controller may be configured to extract a person detected region when a person is detected in the image, to acquire the gain value corresponding to a size of the person detected region, to acquire the color corrected image by multiplying the color of the brightness corrected image by the gain value, and to output the color corrected image through the display unit.

The display device may further include a memory configured to store a gain table indicating the gain value corresponding to the size of the person detected region.

The gain value corresponding to the size of the person detected region may have a first gain value when the size of the person detected region is smaller than or equal to a preset first value and may have a value smaller than the first gain value when the size of the person detected region exceeds the preset first value.

The gain value corresponding to the size of the person detected region may have a first gain value when the size of the person detected region is a preset first value, may have a second gain value when the size of the person detected region is a preset second value, may have a third gain value when the size of the person detected region is a preset third value, the first value may be smaller than the second value, the second value may be smaller than the third value, the first gain value may be greater than the second gain value, and the second gain value may be greater than the third gain value.

A slope from the first gain value to the second gain value may be greater than a slope from the second gain value to the third gain value.

When a plurality of persons are detected in the image, the controller may be configured to extract each of the plurality of person detected regions, to acquire a gain value corresponding to the sum of sizes of the plurality of person detected regions, and to acquire the color corrected image by multiplying the color of the brightness corrected image by the gain value.

The color corrected image may be output through the display unit.

The display device may further include a color coordinate converting unit configured to convert a color into color coordinates, wherein the color coordinate converting unit may be configured to map a color of the image to a first color coordinate value, to map the brightness corrected image to a second color coordinate value, and a direction from the first color coordinate value to the second color coordinate value may follow a direction in which the color becomes lighter.

The controller may be configured to detect the person included in the image using at least one classifier among an object detection algorithm, a neural network, an Adaboost, or a support vector machine.

In another aspect of the present disclosure, there is provided a method of operating a display device including: acquiring a brightness corrected image by correcting brightness of an image; detecting a person included in the image;

acquiring a color corrected image by correcting a color of the brightness corrected image according to whether a person is detected; and outputting the color corrected image.

The acquiring of the brightness corrected image may include: acquiring a brightness value corresponding to each unit pixel included in the image; acquiring a corrected brightness value corresponding to the brightness value using a look-up table; and acquiring a brightness corrected image based on the corrected brightness value.

The acquiring of the color corrected image may include: extracting a person detected region when a person is detected in the image; acquiring the gain value corresponding to a size of the person detected region; and acquiring the color corrected image by multiplying the color of the correction image by the gain value.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Hereinafter, embodiments related to the present disclosure will be described more specifically with reference to the drawings. The suffixes "module" and "unit" for components used in the following description are given or used interchangeably in consideration of only the ease of preparation of the specification, and do not themselves have distinct meanings or roles.

Hereinafter, embodiments related to the present disclosure will be described in detail with reference to the accompanying drawings. In the following description, usage of suffixes such as "module", "part" or "unit" used for referring to elements is given merely to facilitate explanation of the present invention, without having any significant meaning by itself.

Figure 1:
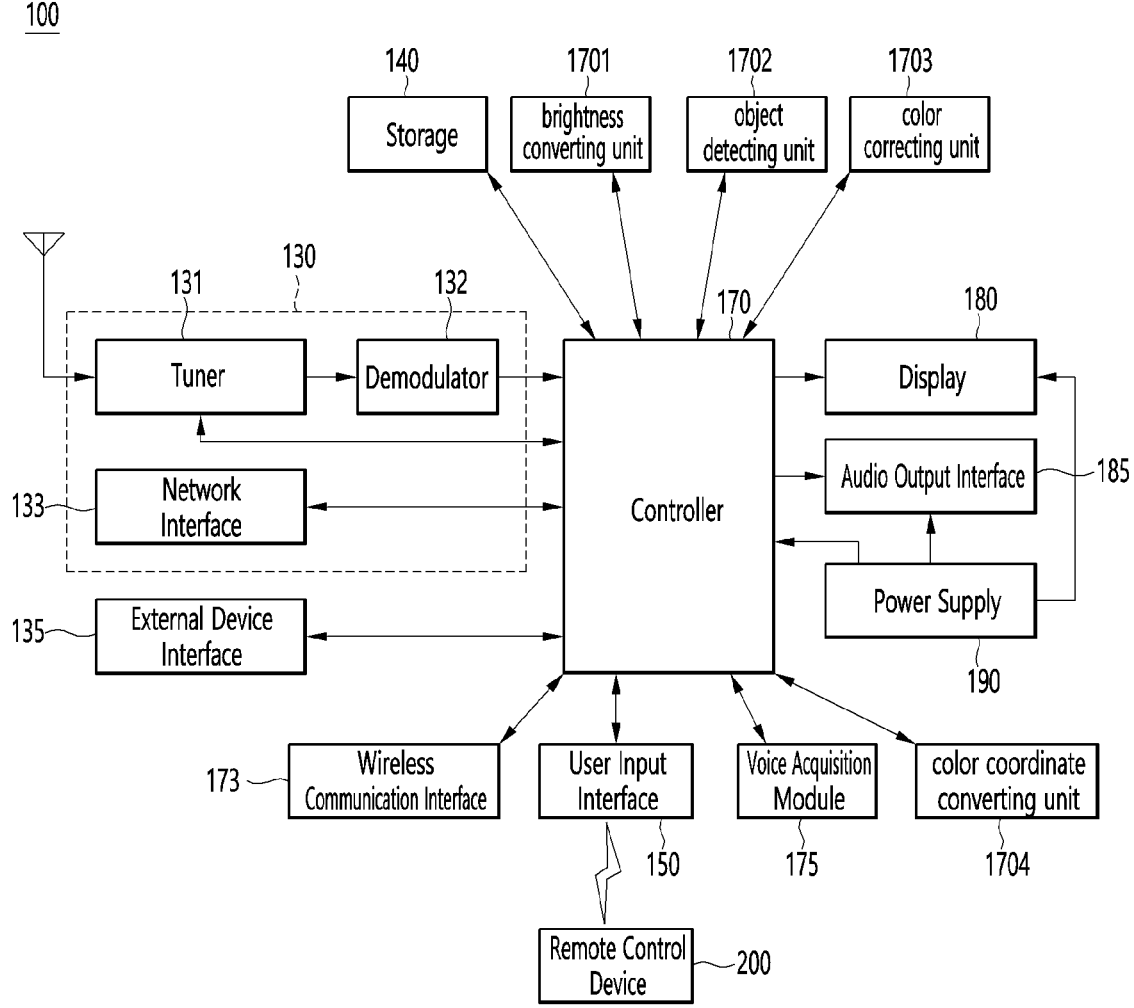
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiving unit 130, an external device interface unit 135, a storage unit 140, a user input interface unit 150, a controller 170, and a wireless communication unit. 173, a voice acquiring unit 175, a display unit 180, an audio output unit 185, and a power supply unit 190.

The broadcast receiving unit 130 may include a tuner 131, a demodulation unit 132, and a network interface unit 133.

The tuner 131 may select a specific broadcast channel according to a channel selection command. The tuner 131 may receive a broadcast signal for the selected specific broadcast channel.

The demodulation unit 132 may separate the received broadcast signal into a video signal, an audio signal, and a data signal related to a broadcast program, and restore the separated video signal, audio signal, and data signal into an outputtable form.

The network interface unit 133 may provide an interface for connecting the display device 100 to a wired/wireless network including the Internet. The network interface unit 133 may transmit or receive data to or from other users or other electronic devices via a connected network or another network linked to the connected network.

The network interface unit 133 may access a predetermined web page through a connected network or another network linked to the connected network. That is, the network interface unit 133 may transmit or receive data to or from a corresponding server by accessing the predetermined web page through a network.

In addition, the network interface unit 133 may receive content or data provided by a content provider or a network operator. That is, the network interface unit 133 may receive content such as movies, advertisements, games, VODs, broadcast signals, and related information provided from a content provider or a network provider via a network.

In addition, the network interface unit 133 may receive update information and an update file of firmware provided by the network operator, and may transmit data to the Internet or content provider or network operator.

The network interface unit 133 may select and receive a desired application from among applications open to the public via a network.

The external device interface unit 135 may receive an application or an application list in an adjacent external device and transmit the received list to the controller 170 or the storage unit 140.

The external device interface unit 135 may provide a connection path between the display device 100 and an external device. The external device interface unit 135 may receive one or more of an image and audio output from an external device connected to the display device 100 by wire or wirelessly and transfer the received image or audio to the controller 170. The external device interface unit 135 may include a plurality of external input terminals. The plurality of external input terminals may include an RGB terminal, one or more high definition multimedia interface (HDMI) terminals, and a component terminal.

An image signal of an external device input through the external device interface unit 135 may be output through the display unit 180. An audio signal of the external device input through the external device interface unit 135 may be output through the audio output unit 185.

An external device connectable to the external device interface unit 135 may be any one of a set-top box, a Blu-ray player, a DVD player, a game machine, a sound bar, a smartphone, a PC, a USB memory, and a home theater, but this is merely an example.

In addition, part of content data stored in the display device 100 may be transmitted to another user registered in advance in the display device 100 or to a selected user or selected electronic from among other electronic devices.

The storage unit 140 may store a program for processing and controlling each signal in the controller 170 and may store a signal-processed image, audio, or data signal.

In addition, the storage unit 140 may perform a function for temporarily storing of an image, audio, or data signal input from the external device interface unit 135 or the network interface unit 133 and store information regarding a predetermined image through a channel memory function.

The storage unit 140 may store an application or an application list input from the external device interface unit 135 or the network interface unit 133.

The display device 100 may play content files (movie files, still image files, music files, document files, application files, etc.) stored in the storage unit 140 and provide the same to the user.

The user input interface unit 150 may receive and process a control signal such as power ON/OFF, channel selection, screen setting, or the like, from the remote controller 200 according to various communication methods such as Bluetooth, ultra-wideband (WB), ZigBee method, radio frequency (RF) communication method, or infrared (IR) communication method or process a control signal form the controller so as to be transmitted to the remote controller 200.

In addition, the user input interface unit 150 may transmit a control signal input from a local key (not shown) such as a power key, a channel key, a volume key, and a set value to the controller 170.

An image signal processed by the controller 170 may be input to the display unit 180 and displayed as an image corresponding to the image signal. Also, the image signal processed by the controller 170 may be input to an external output device through the external device interface unit 135.

An audio signal processed by the controller 170 may be audio output to the audio output unit 185. In addition, a voice signal processed by the controller 170 may be input to an external output device through the external device interface unit 135.

In addition, the controller 170 may control an overall operation of the display device 100.

In addition, the controller 170 may control the display device 100 by a user command or an internal program input through the user input interface unit 150 and download an application or application list desired by the user to the display device 100 by accessing the network.

The controller 170 may cause channel information selected by the user or the like to be output through the display unit 180 or the audio output unit 185 together with a processed image or audio signal.

In addition, the controller 170 may cause an image signal or an audio signal from an external device, e.g., a camera or a camcorder, input through the external device interface unit 135 to be output through the display unit 180 or the audio output unit 185 according to an external device image playback command received through the user input interface unit 150.

Meanwhile, the controller 170 may control the display unit 180 to display an image. For example, the controller 170 may control a broadcast image input through the tuner 131, an external input image input through the external device interface unit 135, and image input through a network interface unit, or an image stored in the storage unit 140 to be displayed on the display unit 180.

In addition, the controller 170 may control content stored in the display device 100, received broadcast content, and external input content input from the outside to be played, and the content may be in various forms such as a broadcast image, an external input image, and an audio file, a still image, a connected web screen, and a document file.

The wireless communication unit 173 may communicate with an external device through wired or wireless communication. The wireless communication unit 173 may perform short range communication with an external device. To this end, the wireless communication unit 173 may support short-range communication using at least one of Bluetooth™, Bluetooth low energy (BLE), radio frequency identification (RFID), infrared data association (IrDA), ultra-wideband (UWB), ZigBee, near field communication (NFC), wireless-fidelity (Wi-Fi), Wi-Fi Direct, and wireless universal serial bus (USB) technologies. The wireless communication unit 173 may support wireless communication between the display device 100 and a wireless communication system, between the display device 100 and another display device 100, or between the display device 100 and a network where the display device 100 (or external server) is located through wireless region networks.

Here, the other display device 100 may be a mobile terminal such as a wearable device (e.g., smartwatch) capable of exchanging (or interworking with) data with the display device 100 according to the present disclosure, smart glass, head-mounted display (HMD), or a smart phone. The wireless communication unit 173 may detect (or recognize) a wearable device capable of performing communication near the display device 100. Furthermore, when the detected wearable device is an authenticated device authenticated to communicate with the display device 100 according to the present disclosure, the controller 170 may transmit at least part of data processed by the display device 100 to the wearable device through the wireless communication unit 173. Accordingly, the user of the wearable device may use data processed by the display device 100 through the wearable device.

The voice acquiring unit 175 may acquire audio. The voice acquiring unit 175 may include at least one microphone (not shown) and may acquire audio around the display device 100 through a microphone (not shown).

The display unit 180 may convert each of an image signal, a data signal, an OSD signal processed by the controller 170 or an image signal, a data signal received from the external device interface unit 135 into R, G, and B signals to generate a driving signal.

Meanwhile, since the display device 100 shown in FIG. 1 is merely an embodiment of the present disclosure, some of the illustrated components may be integrated, added, or omitted according to specifications of the display device 100 which is actually implemented.

That is, if necessary, two or more components may be combined into one component, or one component may be subdivided into two or more components and configured. In addition, functions performed by each block are for explaining an embodiment of the present disclosure, and specific operations or devices thereof do not limit the scope of the present disclosure.

According to another embodiment of the present disclosure, the display device 100 may not include the tuner 131 and the demodulation unit 132 and may receive an image via the network interface unit 133 or the external device interface unit 135 and reproduce the received image.

For example, the display device 100 may be separated and implemented as an image processing device such as a set-top box for receiving a broadcast signal or content according to various network services and a content reproducing device for reproducing content input from the image processing device.

Here, a method of operating the display device according to the embodiment of the present disclosure to be described below may be performed by any one of the image processing device such as the separated set-top box or the like or the content reproducing device including the display unit 180 and the audio output unit 185, as well as the display device 100 described above with reference to FIG. 1.

The audio output unit 185 receives a signal processed by the controller 170 and outputs it as a voice.

The power supply unit 190 supplies corresponding power throughout the display device 100. In particular, the power supply unit 190 may supply power to the controller 170 that may be implemented in the form of a system on chip (SOC), the display unit 180 for displaying an image, and the audio output unit 185 for outputting audio.

Specifically, the power supply unit 190 may include a converting unit that converts AC power into DC power and a dc/dc converting unit that converts a level of DC power.

Next, a remote controller according to an embodiment of the present disclosure will be described with reference to FIGS. 2 to 3.

Figure 2:
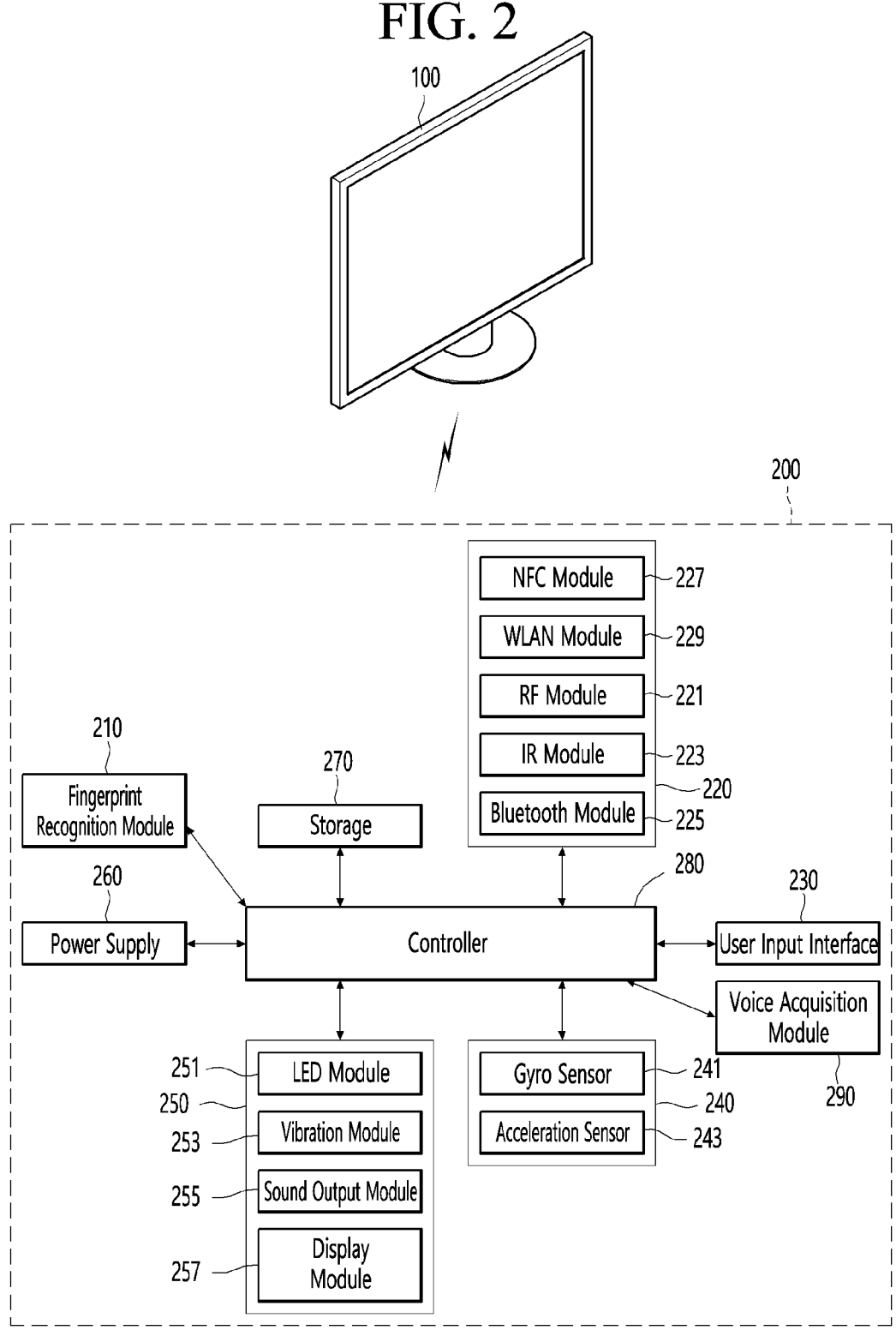
FIG. 2 is a block diagram of a remote controller according to an embodiment of the present disclosure.
Figure 3:
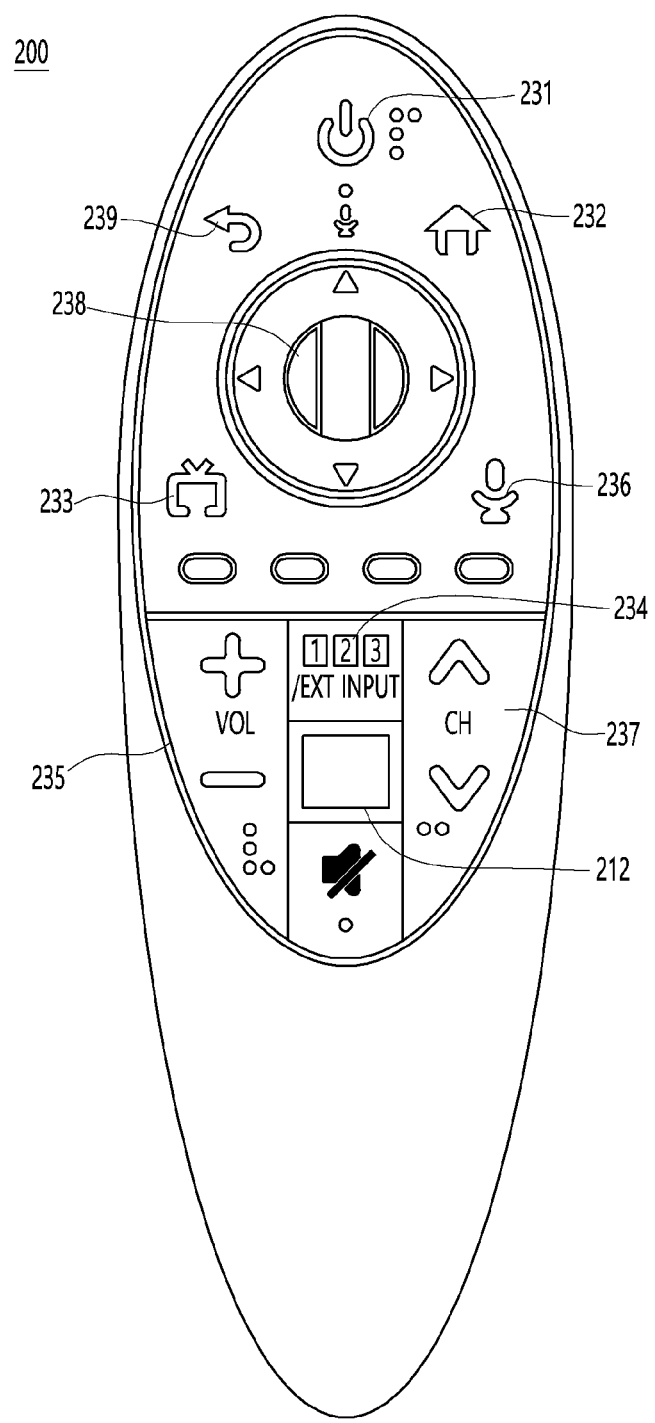
FIG. 3 shows an example of an actual configuration of a remote controller according to an embodiment of the present disclosure.

FIG. 2 is a block diagram of a remote controller according to an embodiment of the present disclosure, and FIG. 3 shows an example of an actual configuration of a remote controller according to an embodiment of the present disclosure.

First, referring to FIG. 2, the remote controller 200 may include a fingerprint recognition unit 210, a wireless communication unit 220, a user input unit 230, a sensor unit 240, an output unit 250, a power supply unit 260, a storage unit 270, a controller 280, and a voice acquiring unit 290.

Referring to FIG. 2, the wireless communication unit 220 transmits and receives signals to and from any one of the display devices according to the embodiments of the present disclosure described above.

The remote controller 200 may include an RF module 221 capable of transmitting and receiving signals to and from the display device 100 according to an RF communication standard and an IR module 223 capable of transmitting and receiving signals to and from the display device 100 according to an IR communication standard. In addition, the remote controller 200 may include a Bluetooth module 225 capable of transmitting and receiving signals to and from the display device 100 according to a Bluetooth communication standard. In addition, the remote controller 200 may include an NFC module 227 capable of transmitting and receiving signals to and from the display device 100 according to an NFC communication standard and a WLAN module 229 capable of transmitting and receiving signals to and from the display device 100 according to a wireless LAN (WLAN) communication standard.

In addition, the remote controller 200 transmits a signal including information on a movement of the remote controller 200 to the display device 100 through the wireless communication unit 220.

Meanwhile, the remote controller 200 may receive a signal transmitted by the display device 100 through the RF module 221, and if necessary, the remote controller 200 may transmit a command regarding power ON/OFF, channel change, volume change, and the like to the display device 100 through the IR module 223.

The user input unit 230 may include a keypad, a button, a touch pad, or a touch screen. The user may input a command related to the display device 100 to the remote controller 200 by operating the user input unit 230. When the user input unit 230 includes a hard key button, the user may input a command related to the display device 100 to the remote controller 200 through a push operation of the hard key button. This will be described with reference to FIG. 3.

Referring to FIG. 3, the remote controller 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. As an example, the fingerprint recognition button 212 is available for a push operation, and thus the fingerprint recognition button 212 may receive a push operation and a fingerprint recognition operation. The power button 231 may be a button for turning on/off power of the display device 100. The home button 232 may be a button for moving to a home screen of the display device 100. The live button 233 may be a button for displaying a real-time broadcast program. The external input button 234 may be a button for receiving an external input connected to the display device 100. The volume control button 235 may be a button for adjusting a volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back button 239 may be a button for returning to a previous screen.

FIG. 2 will be described again.

When the user input unit 230 includes a touch screen, the user may input a command related to the display device 100 to the remote controller 200 by touching a soft key of the touch screen. In addition, the user input unit 230 may include various types of input units that a user may operate, such as a scroll key or a jog key, and the present embodiment does not limit the scope of the present disclosure.

The sensor unit 240 may include a gyro sensor 241 or an acceleration sensor 243, and the gyro sensor 241 may sense information on a movement of the remote controller 200.

For example, the gyro sensor 241 may sense information on an operation of the remote controller 200 based on x, y, and z axes, and the acceleration sensor 243 may sense information on a moving speed of the remote controller 200. Meanwhile, the remote controller 200 may further include a distance measuring sensor to sense a distance to the display unit 180 of the display device 100.

The output unit 250 may output an image or audio signal corresponding to an operation of the user input unit 230 or a signal transmitted from the display device 100. Through the output unit 250, the user may recognize whether the user input unit 230 is operated or whether the display device 100 is controlled.

For example, the output unit 250 may include an LED module 251 turned on when the user input unit 230 is operated or a signal is transmitted to or received from the display device 100 through the wireless communication unit 220, a vibration module 253 generating vibration, an audio output module 255 for outputting sound, or a display module 257 for outputting an image.

In addition, the power supply unit 260 may supply power to the remote controller 200, and if the remote controller 200 does not move for a predetermined time, the power supply unit 260 may stop power supply to reduce power waste. The power supply unit 260 may resume power supply when a predetermined key provided in the remote controller 200 is operated.

The storage unit 270 may store various types of programs and application data necessary for controlling or operating the remote controller 200. If the remote controller 200 wirelessly transmits and receives signals to and from the display device 100 through the RF module 221, the remote controller 200 and the display device 100 transmit and receive signals through a predetermined frequency band.

The controller 280 of the remote controller 200 may store information on a frequency band through which signals may be wirelessly transmitted and received to and from the display device 100 paired with the remote controller 200 in the storage unit 270 and refer to the same.

The controller 280 controls all matters related to the control of the remote controller 200. The controller 280 may transmit a signal corresponding to an operation of a predetermined key of the user input unit 230 or a signal corresponding to a movement of the remote controller 200 sensed by the sensor unit 240 to the display device 100 through the wireless communication unit 220.

In addition, the voice acquiring unit 290 of the remote controller 200 may acquire a voice.

The voice acquiring unit 290 may include at least one microphone 291 and may acquire a voice through the microphone 291.

Next, FIG. 4 will be described.

Figure 4:
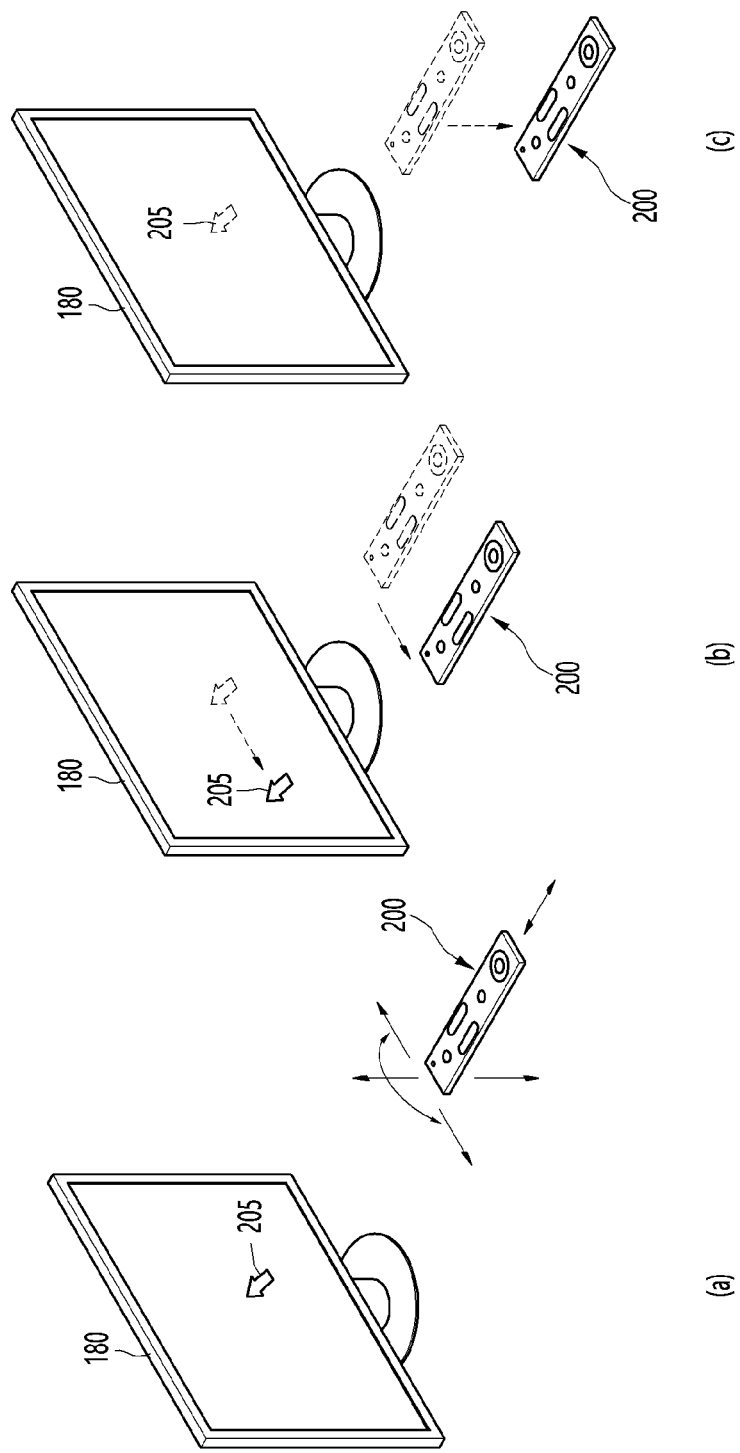
FIG. 4 shows an example of using a remote controller according to an embodiment of the present disclosure.

FIG. 4 shows an example of using a remote controller according to an embodiment of the present disclosure.

(a) of FIG. 4 illustrates that a pointer 205 corresponding to the remote controller 200 is displayed on the display unit 180.

The user may move or rotate the remote controller 200 vertically or horizontally. The pointer 205 displayed on the display unit 180 of the display device 100 corresponds to the movement of the remote controller 200. As shown in the drawing, since the corresponding pointer 205 is moved and displayed according to movement in a 3D space, the remote controller 200 may be referred to as a space remote controller.

(b) of FIG. 4 shows that when the user moves the remote controller 200 to the left, the pointer 205 displayed on the display unit 180 of the display device 100 also moves to the left in response thereto.

Information on the movement of the remote controller 200 sensed through the sensor of the remote controller 200 is transmitted to the display device 100. The display device 100 may calculate coordinates of the pointer 205 from information on the movement of the remote controller 200. The display device 100 may display the pointer 205 to correspond to the calculated coordinates.

(c) of FIG. 4 illustrates a case where the user moves the remote controller 200 away from the display unit 180 in a state of pressing a specific button in the remote controller 200. Accordingly, a selection region in the display unit 180 corresponding to the pointer 205 may be zoomed in and displayed in an enlarged manner.

Conversely, when the user moves the remote controller 200 toward the display unit 180, a selection region in the display unit 180 corresponding to the pointer 205 may be zoomed out and displayed in a reduced size.

Meanwhile, when the remote controller 200 is away from the display unit 180, the selection region is zoomed out, and when the remote controller 200 is close to the display unit 180, the selection region may be zoomed in.

In addition, when a specific button in the remote controller 200 is pressed, recognition of vertical and horizontal movement may be excluded. That is, when the remote controller 200 moves away from or approaches the display unit 180, vertical and horizontal movements are not recognized but only forward and backward movements may be recognized. When a specific button in the remote controller 200 is not pressed, only the pointer 205 moves according to the vertical and horizontal movements of the remote controller 200.

Meanwhile, a moving speed or moving direction of the pointer 205 may correspond to a moving speed or moving direction of the remote controller 200.

Meanwhile, in the present disclosure, a pointer refers to an object displayed on the display unit 180 in response to an operation of the remote controller 200. Accordingly, the pointer 205 may be used to make objects in various shapes other than the arrow shape shown in the drawing. For example, the pointer 205 may have a concept including a point, a cursor, a prompt, and a thick outline. In addition, the pointer 205 may be displayed to correspond to any one of a horizontal axis and a vertical axis on the display unit 180, as well as a plurality of points such as a line and a surface.

Meanwhile, referring to FIG. 1, the display device 100 of the present disclosure may further include a brightness converting unit 1701 generating a brightness corrected image by correcting brightness of an image to be output, an object detecting unit 1702 detecting a specific object included in an image, a color correcting unit 1703 generating a color corrected image by correcting a color of the image using a gain value when a specific object is detected in the image, and a color coordinate converting unit 1704 mapping pixel parameters to color coordinates.

Here, the controller 170 may control an overall operation of the display device 100, control the brightness converting unit 1701, the object detecting unit 1702, the color correcting unit 1703, and the color coordinate converting unit 1704, and according to an embodiment, the controller 170 may perform operations of the brightness converting unit 1701, the object detecting unit 1702, the color correcting unit 1703, and the color coordinate converting unit 1704.

In addition, in describing an embodiment of the present disclosure, a brightness corrected image is acquired by adjusting brightness values (0 to 255) of a pixel and a color corrected image is acquired by adjusting a color value, but this is only an example and the embodiment of the present disclosure is not limited to a color model divided into a brightness value and a color value.

In other words, in correcting brightness or a color value according to an embodiment of the present disclosure, it may be sufficient to correct brightness or color by adjusting a parameter of a color model, and a color model in which brightness and the color are associated could also be used.

For example, the present disclosure may be applied to all display devices using a color model capable of correcting brightness and color, such as a gray model, an RGB model, an HSV model, and a YCbCr model.

Meanwhile, in an embodiment of the present disclosure, it is preferable to use a color model including a brightness value Y and a color CbCr value as separate parameters, such as YCbCr among the color models.

Figure 5:
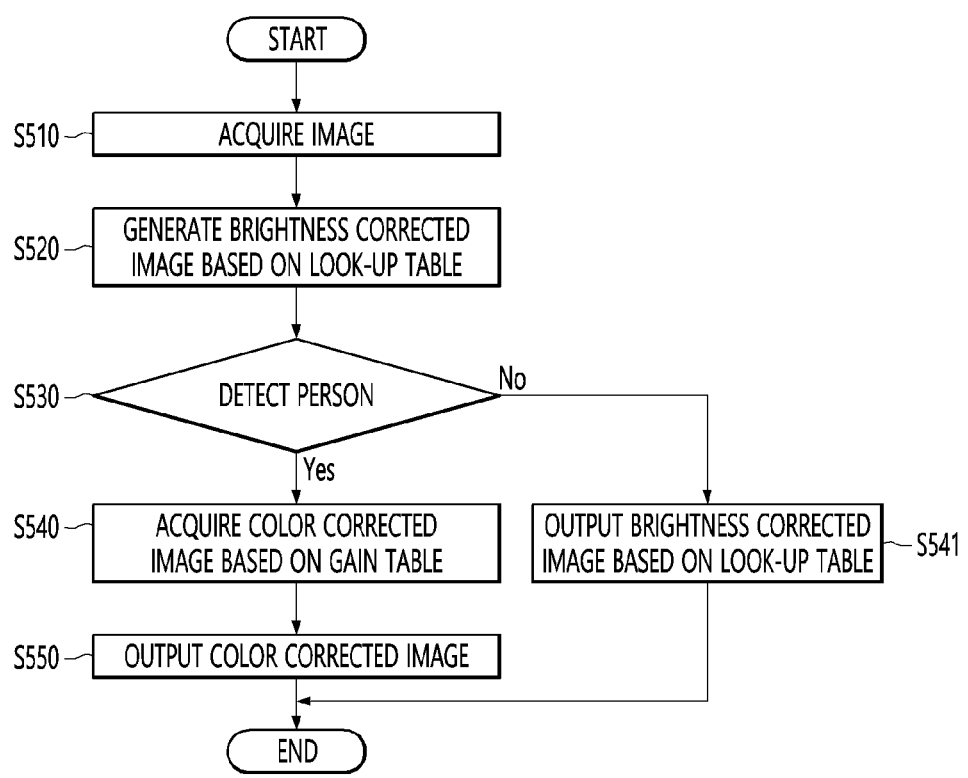
FIG. 5 is a flowchart according to an embodiment of the present disclosure.

FIG. 5 shows a flowchart according to an embodiment of the present disclosure.

Referring to FIG. 5, the controller 170 of the display device 100 may acquire an image (S510). Specifically, the image may include image data received from any one of the tuner 131, the network interface unit 133, and the external device interface unit 135.

The brightness converting unit 1701 may generate a brightness corrected image by adjusting brightness of the acquired image (S520). Specifically, the brightness converting unit 1701 may acquire a brightness value corresponding to each unit pixel included in the image.

The brightness converting unit 1701 may acquire a corrected brightness value according to a mapping value corresponding to the acquired brightness value. Here, the mapping value may be a predetermined value.

Specifically, a mapping value for converting the brightness value to the corrected brightness value may be determined through a look-up table including a linear or nonlinear section.

Here, the look-up table may refer to a graph corresponding to a brightness value and the corrected brightness value, and the shape or shape of the graph may be changed based on an image output from the display device.

The brightness converting unit 1701 may acquire a brightness corrected image acquired by correcting the brightness value of each of the unit pixels based on the corrected brightness value.

More specifically, the brightness converting unit 1701 may acquire a corrected brightness value corresponding to the brightness value of each unit pixel and acquire the brightness corrected image by applying the corrected brightness value to all pixels included in the image.

Meanwhile, the mapping value or mapping table may be predetermined during the process of releasing of the display device, and the mapping value or mapping table may be stored in the storage unit 140 of the display device.

Hereinafter, an example of generating a brightness corrected image will be described with reference to FIG. 6.

Figure 6:
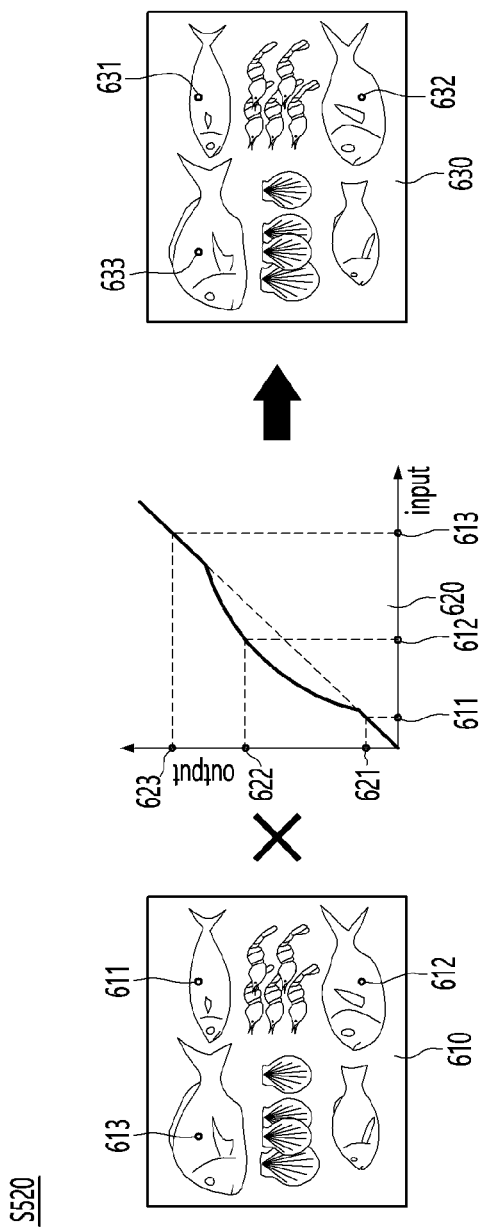
FIG. 6 is a view illustrating a process of generating a brightness corrected image according to an embodiment of the present disclosure.

FIG. 6 is a view illustrating a process of generating a brightness corrected image according to an embodiment of the present disclosure.

Referring to FIG. 6, the brightness converting unit 1701 may acquire a brightness value corresponding to each unit pixel included in an image 610. For example, when the brightness value ranges from 0 to 255, a brightness value 611 of a first pixel among a plurality of unit pixels included in the image 610 is '50', a brightness value 612 of a second pixel is '100', and a brightness value 613 of a third pixel is '200', then the brightness converting unit 1701 may acquire corrected brightness values 621, 622, and 623 corresponding to the brightness value 611 of the first pixel, the brightness value 612 of the second pixel, and the brightness value 613 of the third pixel in the image 610.

Specifically, the look-up table 620 may include a linear or nonlinear section and include at least one of a first section in which a brightness value is output as is when the brightness value is input, a second section in which a brightness value lower than the input brightness value is output when the brightness value is input, and a third section in which a brightness value higher than the input brightness value when the brightness value is input.

According to an embodiment of the present disclosure, referring to the look-up table 620 of FIG. 6, the look-up table 620 including a combination of at least one first section and at least one third section is disclosed.

The brightness converting unit 1701 may acquire a first corrected brightness value 621 corresponding to the brightness value 611 of the first pixel using the look-up table 620. Similarly, the brightness converting unit 1701 may acquire a second corrected brightness value 622 corresponding to the brightness value 612 of the second pixel and acquire a third corrected brightness value corresponding to the brightness value 613 of the third pixel 623.

For example, the first corrected brightness value 621 may be mapped to '50' equal to the brightness value 611 of the first pixel, the second corrected brightness value 622 may be mapped to '125' greater than the brightness value 612 of the second pixel, and the third corrected brightness value 623 may be mapped to have the same '200' as the brightness value 613 of the third pixel.

The brightness converting unit 1701 may acquire a corrected brightness value for each of the plurality of unit pixels included in the image using the look-up table 620 and acquire a final brightness corrected image 630.

Here, the first pixel 631 of the brightness corrected image 630 may have a first corrected brightness value 621 and may have the same brightness value as the first pixel 611 of the image 610.

In addition, the second pixel 632 of the brightness corrected image 630 may have a second corrected brightness value 622 and may have a higher brightness value than the second pixel 612 of the image 610.

In addition, the third pixel 633 of the brightness corrected image 630 may have a third corrected brightness value 623 and may have the same brightness value as the third pixel 613 of the image 610.

FIG. 5 will be described again.

Referring to FIG. 5, the object detecting unit 1702 may detect an object included in an image (S530). Specifically, the object detecting unit 1702 may detect a person included in the image using an artificial intelligence model. Here, the person may include face information.

According to an embodiment of the present disclosure, the artificial intelligence model may include various algorithms capable of detecting an object such as an object detection algorithm, and detect a person included in the image using at least one classifier among a neural network, Adaboost, and a support vector machine.

Meanwhile, the controller 170 may perform the role of the artificial intelligence model.

The artificial intelligence model may be stored in the storage unit 140 of the display device and may be received from an external server or an external device using the wireless communication unit 173.

The controller 170 may acquire a color corrected image by applying a gain value to a color of the brightness corrected image according to whether the person is detected.

According to an embodiment of the present disclosure, if the object detecting unit 1702 does not detect a person because a person is not included in the image (S530—NO), the controller 170 may output the brightness corrected image acquired in step S520 through the display unit 180 (S541).

If a face is not detected in the image, the controller 170 may output an image whose brightness and color are enhanced compared to the existing image by outputting a brightness corrected image whose brightness is corrected. In the case of S541, since a face is not detected in the image, color distortion of a person detected region due to brightness correction may not occur.

According to an embodiment of the present disclosure, when the object detecting unit 1702 detects a person in the image including a person (S530—YES), the controller 170 may extract a person detected region.

Specifically, the object detecting unit 1702 may detect a person through the object detection algorithm or the classifier of the artificial intelligence model described above.

The controller 170 may classify the person among objects detected by the object detecting unit 1702 and localize a region classified as a person. Here, the localized region may be a person detected region.

For example, the controller 170 may generate a bounding box in the region classified as a person and extract the region in which a person is detected. Here, the bounding box may have a width (w) and a height (h) based on a center point (x,y).

The controller 170 may acquire a gain value corresponding to a size of the region in which a person is detected. Here, the size of the region in which the person is detected may be calculated as a product of the width (w) and the height (h) of the generated bounding box.

According to an embodiment of the present disclosure, the gain value may have the same value or a different value according to the size of the region in which a person is detected, and may have a value of 0 or greater and 1 or less.

A relation between the size of the region in which a person is detected and the gain value may be displayed in a gain table, and the gain table may be stored in the storage unit 140 of the display device.

The process of acquiring the gain value will be described in detail later in FIGS. 8 and 9.

After the gain value is acquired, the controller 170 may acquire the color corrected image by multiplying the color of the brightness corrected image by the gain value (S540).

Here, as described above, since the gain value has a value of 1 or less, the color corrected image may be darker than the brightness corrected image, or a color-related parameter may be set to be lighter.

As described above, by generating a color corrected image in which the color is further adjusted (down) by multiplying the brightness corrected image by the gain value, color distortion in a skin color of a person may be minimized by the brightness correction.

Thereafter, the controller 170 may output a color corrected image through the display unit 180 (S550).

Hereinafter, an output result of the brightness corrected image to which the gain value is not applied in FIG. 7 will be described, and an output result of the color corrected image acquired by applying the gain value in FIG. 8 will be described.

Figure 7:
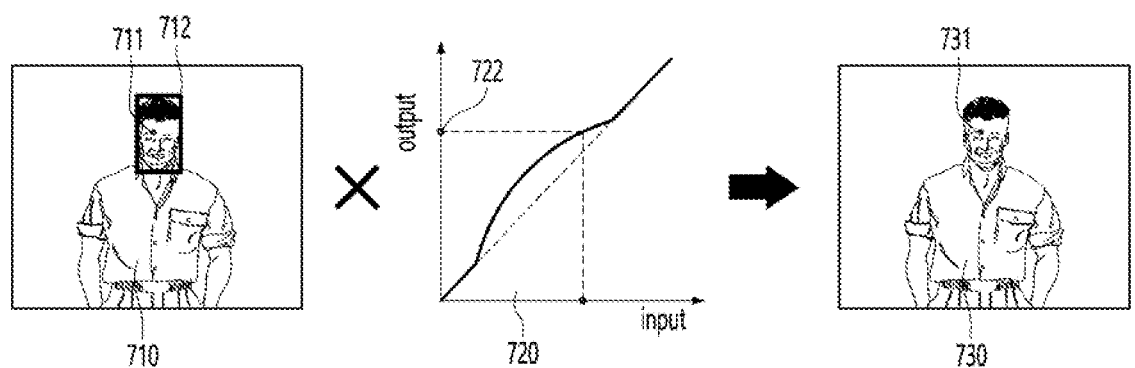
FIG. 7 is a view illustrating a process of generating a brightness corrected image from an image including a person according to an embodiment of the present disclosure.
Figure 8:
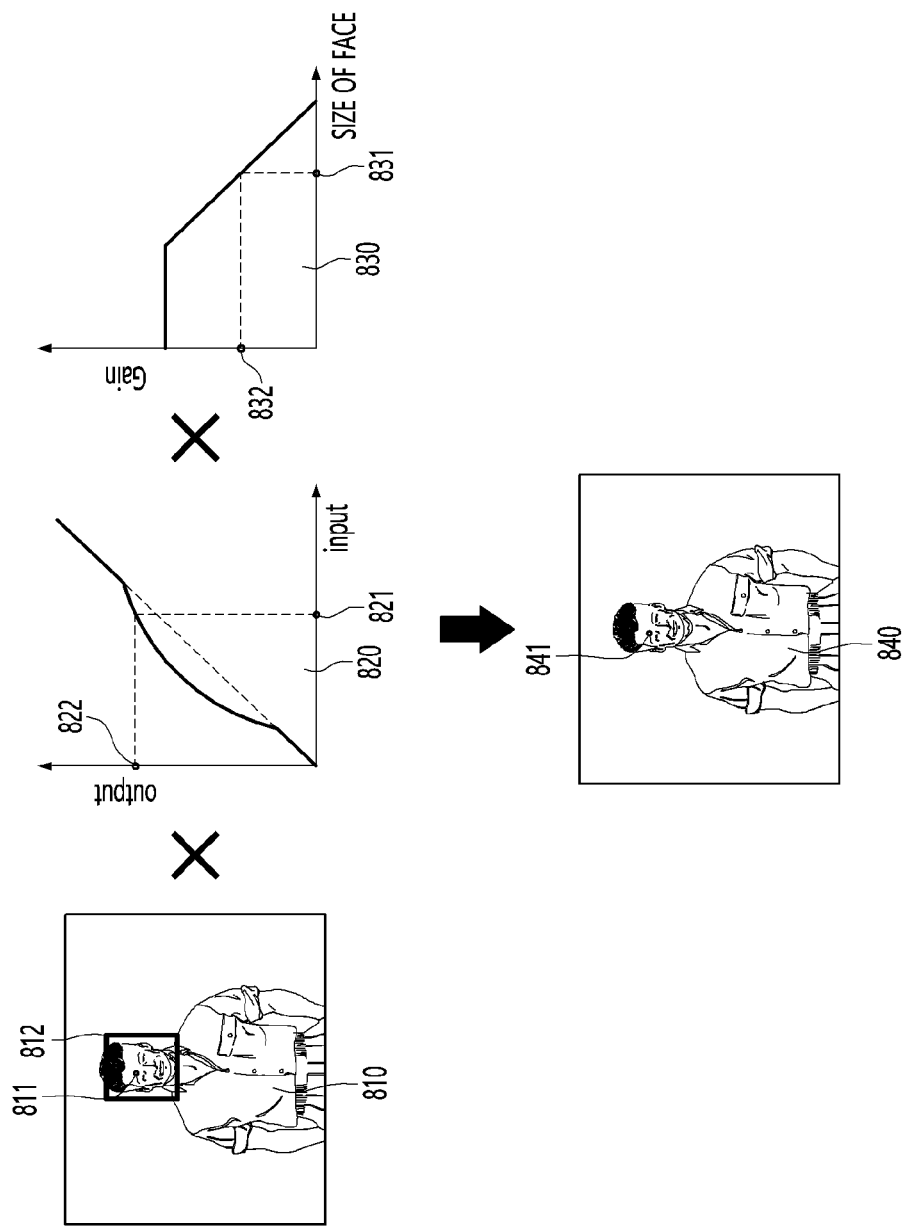
FIG. 8 is a view illustrating a process of generating a color corrected image from an image including a person according to an embodiment of the present disclosure.

FIG. 7 is a diagram for comparing an image output when color correction is performed on the image in which a person is detected and the output result of the image in which color correction is performed in FIG. 8.

Referring to FIG. 7, the object detecting unit 1702 may detect a person 711 from an acquired image 710.

The controller 170 may generate a bounding box 712 in a region classified as a person by localizing a face part of the region of the person 711 detected by the object detecting unit 1702.

For example, the controller 170 may generate a bounding box in the region classified as a person and extract the region 712 in which a person is detected. Here, the bounding box may have a width (w) and a height (h) based on a center point (x,y).

As described with reference to FIG. 6, the brightness converting unit 1701 may acquire a corrected brightness value of each unit pixel included in the image 710 by using the look-up table 720.

For example, the brightness converting unit 1701 may acquire a corrected brightness value 722 corresponding to the brightness value 711 of the first pixel of the image 710. When the corrected brightness value of each unit pixel included in the image 710 is acquired, the brightness converting unit 1701 may acquire the brightness corrected image 730.

In the brightness corrected image 730, a parameter related to a brightness value may be set high in at least one pixel included in the image 710, and as the parameter related to the brightness value is set high, color distortion may occur in the region of the person 731 of the brightness corrected image 730.

In order to solve the problem occurring in the brightness corrected image 730 as shown in FIG. 7, a process of acquiring a color corrected image according to a gain value of the present disclosure will be described in FIG. 8 below.

Referring to FIG. 8, the object detecting unit 1702 may detect a person 811 from an acquired image 810.

The controller 170 may generate a bounding box 812 in a region classified as a person by localizing a face part of the region of the person 811 detected by the object detecting unit 1702.

For example, the controller 170 may generate the bounding box 812 in the region classified as a person to extract a region in which a person is detected.

The brightness converting unit 1701 may acquire a corrected brightness value of each unit pixel included in the image 810 by using the look-up table 820 as described with reference to FIG. 6.

For example, a corrected brightness value 822 corresponding to the brightness value 821 of the first pixel of the image 810 may be acquired. When the corrected brightness value of each unit pixel included in the image 810 is acquired, the brightness converting unit 1701 may acquire a brightness corrected image.

The controller 170 may acquire a gain value 832 corresponding to a size 831 of the region 812 in which the person 811 is detected. Here, the size 831 of the region in which a person is detected may be calculated as a product of a width and a height of the generated bounding box.

Here, the size 831 of the region in which a person is detected may include a size of the region in which the face of the person is detected, and a corresponding relation between the size of the region in which the face is detected and the gain value 832 may appear as a gain table 830.

Here, the gain table 830 may be variously designed according to a type of an image, and a corresponding embodiment will be described with reference to FIG. 9.

The controller 170 may acquire a color corrected image 840 by multiplying a color of the brightness corrected image by the acquired gain value 832.

Specifically, the controller 170 may acquire the color corrected image 840 by multiplying a color parameter of each unit pixel included in the brightness corrected image by the acquired gain value 832 and combining the color parameters of the respective unit pixels to which the gain value 832 is assigned.

Here, since the gain value 832 has a value between 0 and 1, a parameter value related to brightness or color of the color corrected image 840 is reduced compared to the brightness corrected image, thereby minimizing the occurrence of color distortion of a person detected region 841.

Meanwhile, in the embodiment of the present disclosure, when a plurality of persons are detected in an image, the controller 170 may extract a plurality of person detected regions, acquire a gain value corresponding to the sum of sizes of the plurality of person detected regions, and acquire the color corrected image by multiplying the color of the brightness corrected image by the gain value.

For example, when a plurality of persons are detected, the controller 170 may extract each of faces of the plurality of people and acquire the sum of widths of bounding boxes of the extracted faces as a size 831 of the region in which a person is detected.

The controller 170 may acquire a gain value 832 corresponding to a size 831 of the region in which a person is detected, and acquire a color corrected image by multiplying the color of the brightness corrected image by the gain value 832.

Thereafter, when the color corrected image is acquired, the controller 170 of the present disclosure may output the color corrected image through the display unit 180 (S550).

Meanwhile, in FIG. 5, after the brightness corrected image according to the look-up table is generated (S520), person detection is performed (S530), but this is only an example and, after a person detection is first performed in the image, the brightness corrected image may be generated according to the look-up table.

Further, the object detecting unit 1702 may perform object detection from an image or may perform object detection from a brightness corrected image.

Figure 9:
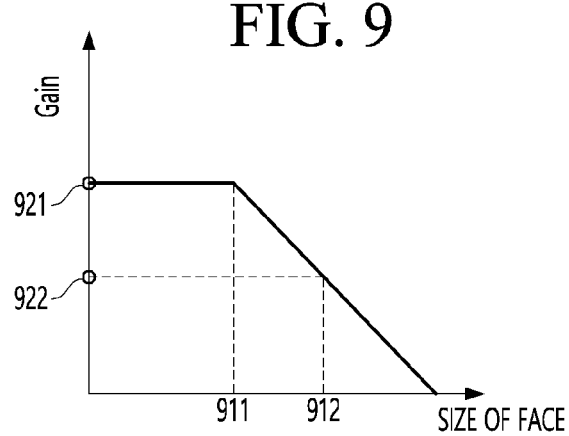
FIG. 9 is a view illustrating a gain table according to an embodiment of the present disclosure.
Figure 9:
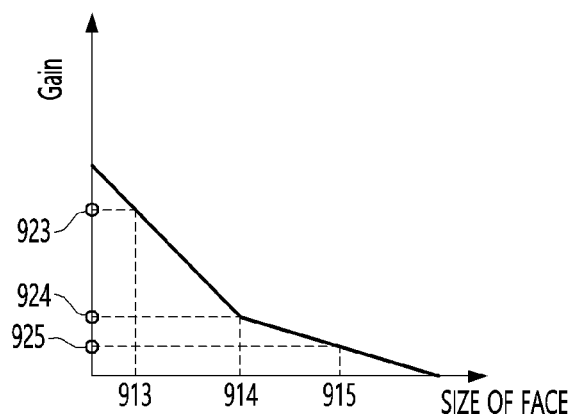
Figure 9:
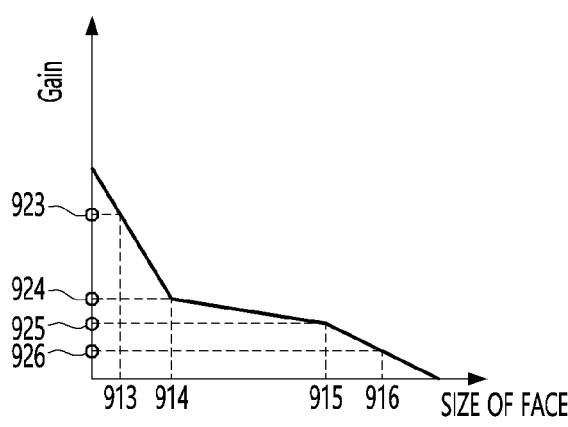

FIG. 9 is a view illustrating a gain table according to an embodiment of the present disclosure.

Referring to FIG. 9, a first gain table (a), a second gain table (b), and a third gain table (c) among examples of various gain tables are shown.

Referring to the first gain table (a), a gain value corresponding to a size of a person detected region may include a first gain value 921 if a size of the person detected region is equal to or smaller than a preset first value 911, and may include a second gain value 922 smaller than the first gain value 921 if the size of the person detected region is a second value 912 exceeding the preset first value 911.

Specifically, if the size of the person detected region exceeds a preset value using the first gain table (a), the controller 170 may acquire a color corrected image by decreasing the gain value.

The first gain table (a) may be used to generate a color corrected image based on experimental data in which color distortion rarely occurs when a size of a person detected region included in an image is smaller than a preset first value.

Referring to the second gain table (b), a gain value corresponding to the size of the person detected region may have a first gain value 923 if the size of the person detected region is a preset first value 913, may have a second gain value 924 if the size of the person detected region is a preset second value 914, and may have a third gain value 925 if the size of the person detected region is a preset third value 915.

Here, the first value 913 may be smaller than the second value 914, and the second value 914 may be smaller than the third value 915. Further, the first gain value 923 may be greater than the second gain value 924, and the second gain value 924 may be greater than the third gain value 925.

In addition, in the relation among the first gain value 923, the second gain value 924, and the third gain value 925, a slope from the first gain value 923 to the second gain value 924 may be greater than a slope from the second gain value 924 to the third gain value 925.

In other words, the slope from the first value 913 to the second value 914 in the second gain table (b) may be steeper than the slope from the second value 914 to the third value 915.

Specifically, the controller 170 may acquire a color corrected image by decreasing a gain value as the size of the person detected region increases using the second gain table (b).

In addition, as the size of the person detected region increases, the controller 170 decreases the gain value, and here, a reduction ratio may be set to be different for each specific section to acquire a color corrected image.

The second gain table (b) may be used to generate a color corrected image based on experimental data indicating that an increment of color distortion decreases if experimental data indicating that the influence of color distortion is large according to the presence or absence of a person detected region included in an image and a size of the person detected region equal to or greater than a preset value exist.

Meanwhile, the third gain table (c) shows an example of a case where, if a fourth value 916 greater than the third value 915 exists in the second gain table (b), a slope from the third gain value 925 to the fourth gain value 926 corresponding to the fourth value 916 increases compared with a slope from the second gain value 924 to the third gain value 925.

As such, the gain table (a, b, c) may be designed in various ways according to the user setting and should not be interpreted to be limited to the form of the gain table shown in FIG. 9 of the present disclosure.

Hereinafter, in FIG. 10, an experimental example in which a color related parameter is changed in a color corrected image as a result of applying a gain value according to a size of a person detected region according to the present disclosure will be described.

Figure 10:
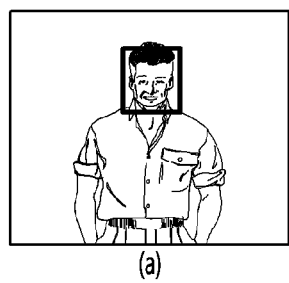
FIG. 10 is a view illustrating a color coordinate system according to an embodiment of the present disclosure.
Figure 10:
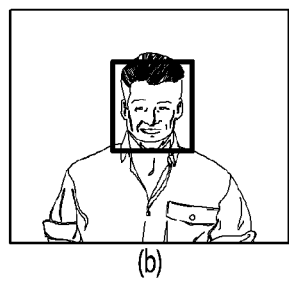
Figure 10:
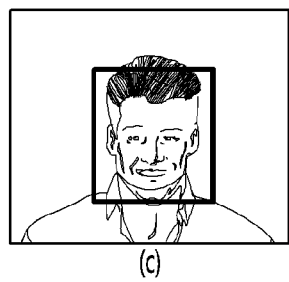
Figure 10:
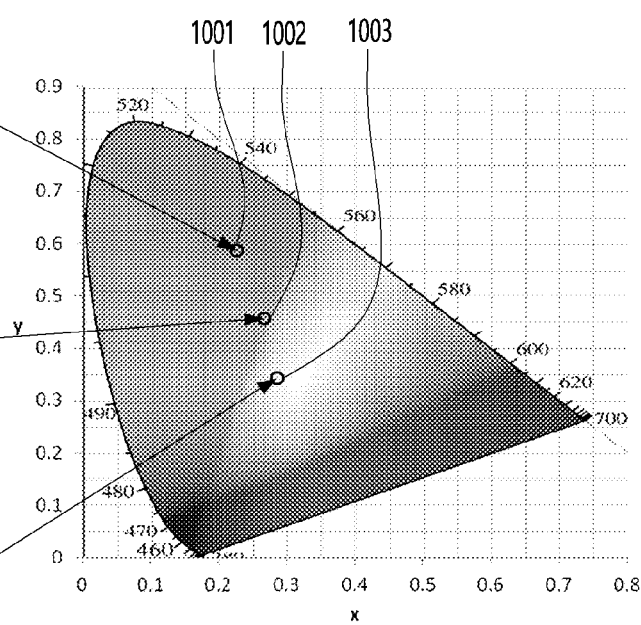

FIG. 10 is a diagram illustrating a color coordinate system according to an embodiment of the present disclosure.

The display device according to an embodiment of the present disclosure may further include a color coordinate converting unit 1704 converting a color into color coordinates.

The color coordinate converting unit may convert a color value of a pixel acquired from an image into a color space and display the same in a coordinate system.

Referring to FIG. 10, the color corrected images of the present disclosure are sequentially arranged from an image having a small size of a person detected region to an image having a large size of a person detected region as (a), (b), and (c) and color coordinates of the same pixel position are converted in color coordinates.

Specifically, the color coordinate converting unit 1704 may map a color of the brightness corrected image (a) to a first color coordinate value 1001, map the brightness corrected image (b) to a second color coordinate value 1002, and the brightness corrected image c to a third color coordinate value 1003.

Here, it may be observed that a direction from the first color coordinate value 1001 toward the second color coordinate value 1002 follows a direction in which the color becomes lighter.

In addition, it may be observed that the direction from the second color coordinate value 1002 toward the third color coordinate value 1003 follows the direction in which the color becomes lighter.

Based on the experiment result, the display device 100 of the present disclosure may acquire a gain value according to whether a person is detected and acquire a color corrected image using the gain value, thereby preventing the occurrence of color distortion.

Meanwhile, a method of operating a display device according to an embodiment of the present disclosure may include acquiring a brightness corrected image by correcting brightness of an image, detecting a person included in the image, acquiring a color corrected image by correcting a color of the brightness corrected image according to whether a person is detected, and outputting the color corrected image.

In addition, the acquiring of the brightness corrected image may include acquiring a brightness value corresponding to each unit pixel included in the image, acquiring a corrected brightness value corresponding to the brightness value using a look-up table, and acquiring a brightness corrected image based on the corrected brightness value.

In addition, the acquiring of the color corrected image may include extracting a person detected region when a person is detected in the image, acquiring the gain value corresponding to a size of the person detected region, and acquiring the color corrected image by multiplying a color of the correction image by the gain value.

The present disclosure may generate a color corrected image based on a color gain and output the color corrected image, thereby providing an image without color distortion which is a side effect of image enhancement to the user.

The present disclosure may provide image enhancement optimized for an output image by using different color gains according to whether a person is detected.

According to the present disclosure, when a person is detected, an image enhancement optimized for an output image may be provided by setting a different color gain value corresponding to a size of a region where the person is detected.

The present disclosure may be implemented as a computer-readable code on a program recording medium. A computer-readable recording medium may be any recording medium that stores data that may be read by a computer system. Examples of the computer-readable medium include hard disk drive (HDD), solid state disk (SSD), silicon disk drive (SDD), read-only memory (ROM), random access memory (RAM), CD-ROM, magnetic tape, floppy disk, and optical data storage device. In addition, the computer may include the controller 170 of the display device 100.

The above description is to simply illustrate the technical scope of the present disclosure and various modifications and substitutions can be made by those skilled in the art without departing from the scope of the present disclosure.

Accordingly, the embodiment disclosed in the present disclosure and the accompanying drawings are not intended to limit but describe the technical spirit of the present disclosure, and the scope of the technical spirit of the present disclosure is not limited by the embodiment and the accompanying drawings.

The scope of the present disclosure shall b interpreted by the appended claims and it shall be interpreted that all of the technical spirits in the equivalent range are included in the scope of the present disclosure.

What is claimed is:

1. A display device comprising:
a display configured to output an image;
a brightness converter configured to acquire a brightness corrected image by correcting a brightness of the image; and
a controller configured to:
detect whether a face is included in the image;
acquire a color corrected image by applying a gain value to a color of the brightness corrected image based on whether the face is detected; and
output the color corrected image or the brightness corrected image through the display,
wherein when the face is detected in the image, the controller is further configured to:
extract a face detected region based on the detected face;
acquire the gain value corresponding to a size of the face detected region;
acquire the color corrected image by multiplying the color of the brightness corrected image by the gain value; and
output the color corrected image through the display.

2. The display device of claim 1,
wherein the brightness converter is further configured to:
acquire a plurality of brightness values, each of the brightness values corresponding to a respective unit pixel included in the image;
acquire a plurality of corrected brightness values, each of the corrected brightness values corresponding to a respective brightness value of the brightness values, through a look-up table including a linear or nonlinear section; and
acquire the brightness corrected image obtained by correcting each of the brightness values based on the corresponding corrected brightness value of the plurality of corrected brightness values.

3. The display device of claim 2,
wherein the controller is further configured to output the brightness corrected image through the display when the face is not detected in the image.

4. The display device of claim 1, further comprising:
a memory configured to store a gain table indicating the gain value corresponding to the size of the face detected region.

5. The display device of claim 1,
wherein the gain value corresponding to the size of the face detected region is equal to a first gain value when the size of the face detected region is smaller than or equal to a preset first value, and is smaller than the first gain value when the size of the face detected region exceeds the preset first value.

6. The display device of claim 1,
wherein the gain value corresponding to the size of the face detected region is equal to a first gain value when the size of the face detected region is equal to a preset first value, is equal to a second gain value when the size of the face detected region is equal to a preset second value, and is equal to a third gain value when the size of the face detected region is equal to a preset third value, and
wherein the preset first value is smaller than the preset second value, the preset second value is smaller than the preset third value, the first gain value is greater than the second gain value, and the second gain value is greater than the third gain value.

7. The display device of claim 6,
wherein a slope from the first gain value to the second gain value is greater than a slope from the second gain value to the third gain value.

8. The display device of claim 1,
wherein when a plurality of faces are detected in the image, the controller is further configured to:
extract each of a plurality of face detected regions;
acquire a gain value corresponding to a sum of sizes of the plurality of face detected regions;

acquire the color corrected image by multiplying the color of the brightness corrected image by the gain value corresponding to the sum of the sizes; and output the color corrected image through the display.

9. The display device of claim 1, further comprising:

a color coordinate converter configured to convert a color into color coordinates, wherein the color coordinate converter is configured to:

convert a color of the image to a first color coordinate value; and convert the brightness corrected image to a second color coordinate value, and wherein a direction from the first color coordinate value to the second color coordinate value follows a direction in which the color of the color coordinates becomes lighter.

10. The display device of claim 1, wherein the controller is further configured to detect whether the face is included in the image using at least one classifier among an object detection algorithm, a neural network, an Adaboost, or a support vector machine.

11. A method of operating a display device, the method comprising:

acquiring a brightness corrected image by correcting a brightness of an image which is output on the display device;

detecting whether a face is included in the image;

acquiring a color corrected image by correcting a color of the brightness corrected image according to whether the face is detected; and outputting, by a display of the display device, the color corrected image, wherein acquiring the color corrected image comprises:

extracting a face detected region when the face is detected in the image;

acquiring a gain value corresponding to a size of the face detected region; and acquiring the color corrected image by multiplying the color of the brightness corrected image by the gain value.

12. The method of claim 11, wherein acquiring the brightness corrected image comprises:

acquiring a plurality of brightness values, each of the brightness values corresponding to a respective unit pixel included in the image;

acquiring a plurality of corrected brightness values, each of the corrected brightness values corresponding to a respective brightness value of the brightness values, using a look-up table; and acquiring the brightness corrected image based on the plurality of brightness corrected values.

13. The method of claim 11, further comprising:

detecting whether the face is included in the image using at least one classifier among an object detection algorithm, a neural network, an Adaboost, or a support vector machine.

* * * * *